Patented Aug. 2, 1949

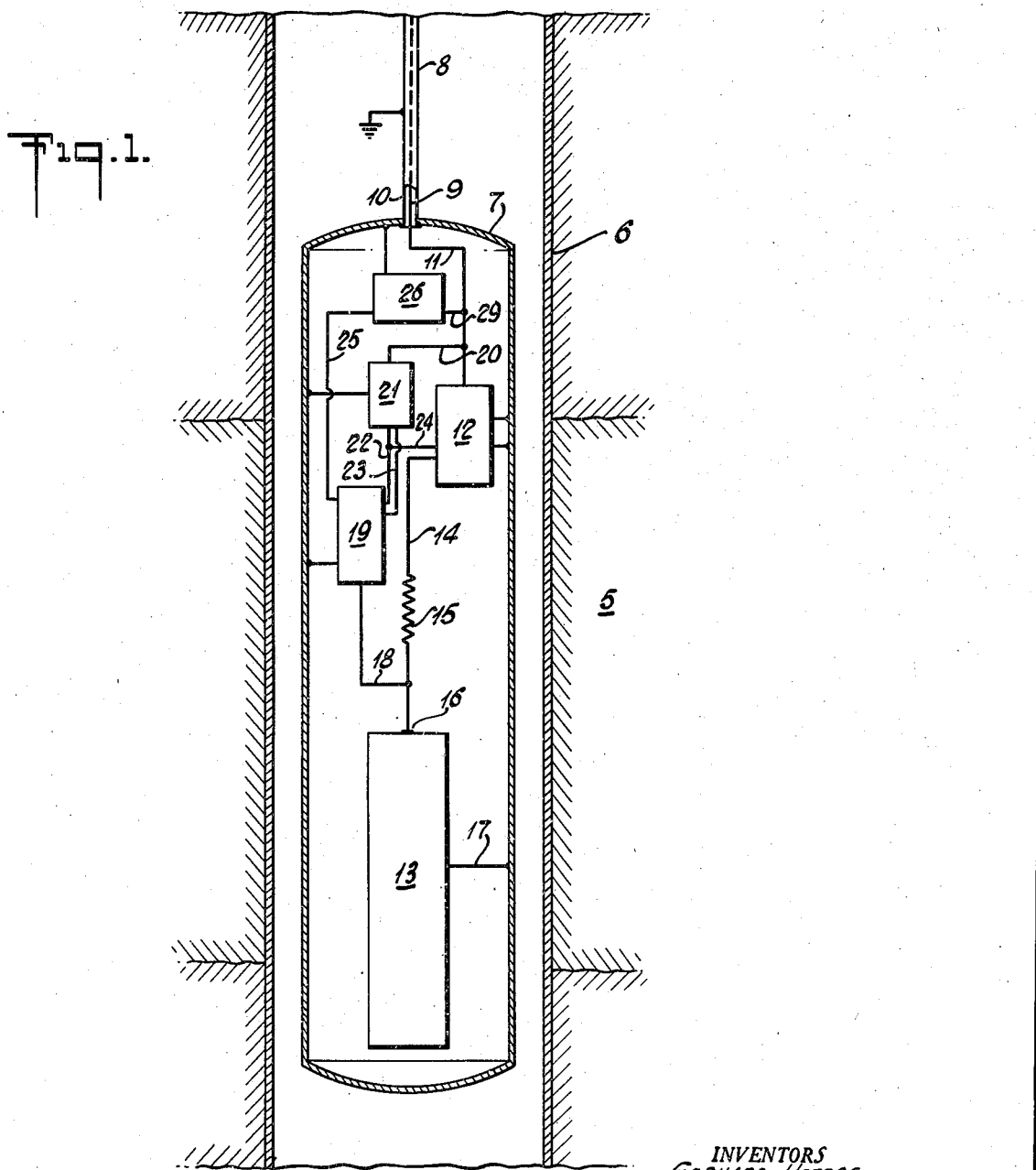

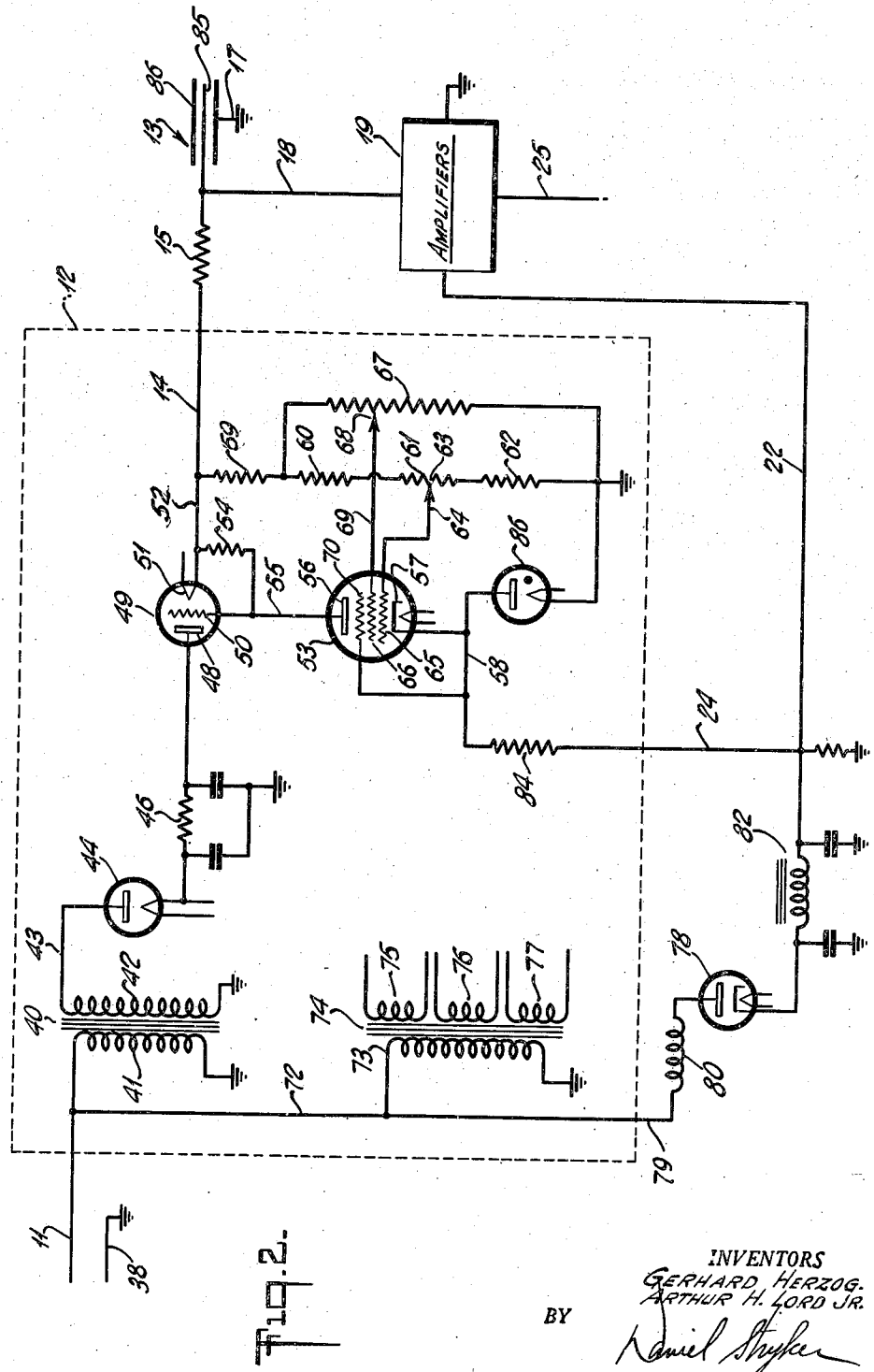

2,477,802

UNITED STATES PATENT OFFICE 2,477,802

VOLTAGE CONTROL AND STABILIZING CIRCUITS

Gerhard Herzog and Arthur H. Lord, Jr., Houston, Tex., assignors to The Texas Company, New York, N. Y., a corporation of Delaware Application April 10, 1945, Serial No. 587,502

5 Claims. (Cl. 250—83.6)

The present invention relates to improvements in connection with means for the investigation of the nature and properties of formations such as those surrounding a bore or well, for example, oil wells and bore-holes, and more particularly to the investigation of radioactive properties of these formations, either natural or as modified or influenced by the application of various types of radiation thereto. It is an improvement on the invention described in the application of Gerhard Herzog, Serial No. 583,315, filed March 17, 1945.

In radioactivity well-logging, it has heretofore been proposed to employ for the exploration of the oil wells or bore-holes, instruments containing radiation detectors of various types, such as ionization chambers, in which a continuous current is derived from the detector, the amount of the current varying as a function of the intensity of the radiations from the formations encountered by the instrument; and also to use detectors of the pulse-producing type, from which, instead of continuous currents, current pulses are derived, the frequency of which is a function of the intensity of the radiations from the formations traversed by the instrument. In the use of detectors of the counter type, depending upon specific details of construction and conditions of operation, the size or amplitude of the pulses may be approximately proportional to the initial ionization produced as a result of the radiations from the formations, in which case the detector is designated a proportional counter, or it may be substantially independent of such initial ionization, in which case it may be designated as a non-proportional counter. The well-known Geiger-Müller counter is a detector of the latter type, as are also the high efficiency counters or detectors disclosed in the prior application of D. G. C. Hare and G. Herzog, Serial No. 364,020, filed November 2, 1940 and in the prior application of D. G. C. Hare, Serial No. 412,617, filed September 27, 1941, now U. S. Letters Patents Nos. 2,397,073 and 2,397,071 respectively.

As is well-known, considerable variations in temperature are found in oil wells or bore-holes, particularly in the case of deeper wells, which may extend to depths of two to three miles, or even somewhat deeper. Temperatures as high as 200° to 240° F. may be encountered. In radioactivity well-logging, using devices containing the ionization chamber or continuous current output type of radiation detector, it has been found impractical to log wells in which higher temperatures, say above about 170° F., are encountered, as such devices apparently become ineffective and inaccurate under such conditions.

It has now been found that radioactivity logging of wells, even at the highest temperatures which have been encountered, may be satisfactorily accomplished, employing radiation detectors of the pulse-producing or counter type. As is known, for non-proportional operation, such counters have imposed upon them relatively high direct current voltages and there is a limited range of voltages known as the operating plateau in which the radiation produces pulses which are practically independent of the amount of initial ionization. The voltage for operation of the counter is selected from within this plateau.

It has been found that the proper voltage for operation of such counters varies with the temperature of the counter, increasing with increase of temperature. Thus, a counter such as a Geiger-Müller counter or the high efficiency counters of the applications of Hare and Herzog heretofore referred to, when properly constructed, may operate satisfactorily when a voltage of say 1000 volts is impressed upon it and the counter is at ordinary atmospheric temperature, say about 70° F. It can be raised in temperature to some extent and still operate reasonably satisfactorily at 1000 volts. However, the temperatures constituting the limits of the range or plateau within which the counter may be properly operated, rise as the temperature rises. Thus, if the operating voltage is at an intermediate point on the plateau, some temperature rise may be encountered before it is below the minimum voltage for proper operation.

In order that the counter may be properly operated at the higher temperatures encountered in oil wells, we have found that the voltage impressed across the counter electrodes should be increased with increase in temperature and have devised means whereby this may be automatically effected. Thus we have found that with a high efficiency detector such as that above referred to, for which the operating voltage of the detector is about 1000 volts at 70° F., it should be raised to about 1050 volts when the temperature rises to about 212° F. The specific figures given are illustrative and both the proper operating voltages and the amount of voltage increase for the increase in temperature specified may vary with different detectors. The figures given are those found in connection with the operation of a detector such as that disclosed in the patent of Hare, No. 2,397,071, above referred to.

In carrying out the present invention, we provide within the instrument containing the radiation detector, a source of voltage at a higher potential than that which is to be impressed across the detector electrodes and take from this source a reduced voltage for application to the detector, this reduced voltage being automatically varied with variations in temperature. By way of illustration suitable means for carrying out the present invention are illustrated in the accompanying drawings, in which Fig. 1 illustrates schematically in section an instrument for detecting radiation which may be used in accordance with the present invention, shown within a broken portion of a well or bore-hole, and Fig. 2 illustrates a circuit which may be employed in accordance with the present invention for the control of the high direct current voltage applied to the detector.

Referring more particularly to Fig. 1, the numeral 5 indicates a portion of the formation through which the well passes and the numeral 6 the well casing. Within the well the instrument housing 7 is suspended by the cable 8, which may suitably be a shielded single conductor cable having a central conductor 9 and a shield 10. The latter may be in electrical contact with the casing of the instrument so that the casing and the shield can serve as a return or ground for the electrical equipment within the instrument.

In the embodiment of the invention illustrated, a suitable operating current, such as an alternating current, is supplied to the instrument from the surface, utilizing the conductor 9 and the shield 10, and the amplified pulses resulting from the operation of the detector are returned through the same conductors.

The conductor 9 is connected by the conductor 11 to a power pack 12, which embodies the transformers, rectifiers, and regulators for producing the necessary high voltage potential to be impressed upon the electrodes of the detector. These include the means for varying the voltage applied to the detector in accordance with variations in temperature of the formation through which the instrument is passing. The circuits embodied in power pack 12 are more fully illustrated and described in connection with Fig. 2, to which reference will be made hereinafter.

The direct current high voltage produced in the power pack 12 is impressed upon the anode of the detector 13 through the conductor 14 and resistor 15. The detector, which is of the counter or pulse-yielding type, such as a Geiger-Müller counter or a high efficiency detector such as those described in the prior applications Ser. No. 364,020 and 412,617, above referred to, is diagrammatically illustrated, the anode connection being shown at 16 and a connection for grounding the cathode by connecting it to the instrument housing 7 at 17.

In operation, detector 13 is caused to yield current pulses, the frequency of which is a function of the intensity of the radioactivity of the formation through which the instrument is passing at the time, and this radioactivity may be the natural radioactivity of the formation or may result from or be influenced by a source of radiation which, if desired, may be associated with or included in the instrument. The pulses produced within the detector are transmitted through the conductor 18 to the amplifying and quenching system 19, which may be any suitable type of amplifying and quenching system, preferably one operating to equalize the amplified pulses so that they will be of approximately the same amplitude, such as the circuits illustrated in Strong, Procedures in experimental physics, New York, 1944, pages 283 and 284. It is preferred, however, to employ circuits such as those shown in the application of Hare, Ser. No. 581,647, filed March 8, 1945, or the application of Lord, Ser. No. 589,975, filed April 24, 1945, now U. S. Letters Patent 2,418,892, granted April 15, 1947.

In order to supply currents of intermediate voltages for operation of the amplifiers and other electronic tubes in the power pack and in the amplifying and quenching circuits 19, alternating current may be taken off the conductor 11 through the conductor 20 to a second power pack 21, in which it is transformed or transformed and rectified to produce currents of the desired voltages, these being transmitted to the amplifying circuits 19 and the power pack 12 through the conductors 22, 23, 24.

The amplified and, if desired, equalized pulses from the amplifying circuit 19 are transmitted to the conductor cable through a coupling transformer 26.

In Fig. 2 are illustrated circuits included in the power pack and voltage regulator 12, together with other associated parts of the equipment contained within the instrument housing 7. In connection with Fig. 2, where ground connections are indicated, these may conveniently be connections to the instrument housing 7. The portion of the circuits shown in Fig. 2 that are contained within the power pack and voltage regulator 12 are those within the dotted lines.

In Fig. 2, the conductor 11, which is connected to the cable conductor 9, is shown at the left. The connection of the shield of the cable to ground on the instrument housing is indicated at 38. Conductor 11 is connected to the primary coil 41 of a transformer 40, from the secondary coil 42, of which a high voltage, substantially higher than that required for operation of the detector, is taken off. From the secondary coil 42 of this transformer, the high voltage alternating current produced therein is impressed through conductor 43 upon the plate of a diode rectifier 44, from the cathode of which the rectified current is taken off through filter 46, by which the ripples in the current are smoothed out. This yields a high voltage direct current potential, the value of which is proportional to the voltage of the input and which also changes somewhat with the frequency of the alternating current input. The rectified voltage is impressed on the plate 48 of the electronic control tube 49 which may suitably be a triode, such as a 1H4G tube. The voltage drop through the control tube 49 is controlled by its grid 50 and a controlled D. C. output voltage is obtained which is taken off from the cathode 51 of the control tube 49 through the conductor 14, to be impressed upon the anode of the detector, which is shown schematically in the drawing.

The operation of the control tube 49 is regulated by means of a high vacuum electronic regulator tube 53, which is controlled by the output voltage from the control tube 49 in a manner generally similar to that known in the art but modified in accordance with the present invention to cause variations in temperature to which the instrument is subjected to produce changes in the output voltage of the control tube 49, as required for the efficient operation of the detector.

Referring to the circuits for the control of the voltage of the output of the control tube 49, numeral 54 designates the biasing resistance between the cathode 51 and the control grid 50 of this tube. The bias on the control grid 50 is normally such as to permit the passage of current through the tube and maintain a desired lower voltage on its cathode 51 as compared to the plate 48. The control grid 50 is connected by conductor 55 to the plate 56 of the regulator tube 53, which is illustrated as a pentode such as a 7C7 tube, although other multi-grid tubes or triodes may be used. The plate 56 of tube 53 is also connected through resistor 54 to conductor 14, and derives its operating voltage from the output of tube 49. The cathode 57 of the regulator tube 53 is connected to a conductor 58, which is maintained at a substantially fixed positive voltage above ground, as hereinafter set forth. The cathode 57 of tube 53 is shown as indirectly heated, although obviously a suitable directly heated tube may be used.

Between the conductor 14 carrying the output of the control tube 49 and the ground, there is provided a voltage divider made up of a series of resistors, four being shown. These are the resistors 59, 60, 61 and 62. 61, as illustrated, may be a potentiometer, and from a tap 63 on it a conductor 64 leads to the control grid 65 of the regulator 53. As is apparent, the position of the tap 63 on the potentiometer 61 may be selected to place the desired operating bias on the control grid 65.

The resistors making up the voltage divider are selected of such materials or are so made that the bias voltage imparted to the control grid 65 of pentode 53 varies with changes in temperature as well as with changes in the output of the control tube 49. In order to accomplish this, the ratio of the combined resistances between the tap 63 and the connector 52 to the combined resistances on the low voltage side of the tap 63 must increase with increases in temperature. Thus, one or more of the resistors on the high voltage side of the tap 63 may be made of a material having a high temperature coefficient of resistance say of 0.003 or higher, while one or more of the resistors on the low voltage side of the tap may be made of materials having a low temperature coefficient of resistance say of 0.0004 or lower, including materials having negative temperature coefficients of resistance. Suitable materials for the resistors having a high temperature coefficient of resistance are copper, nickel, iron, silver, phosphor bronze, or the like, and suitable materials for the resistors having low temperature coefficient of resistance are manganin, constantan, Nichrome, graphite, or the like. The temperature coefficients of resistance of various resistance materials suitable for use are well-known; see for example, Radio Engineers' Handbook by Terman, New York, 1943, page 27. Thus, for example, in the form illustrated, the resistors 59, 61 and 62 may be made of constantan, ohmax, or other known material having a low or negative temperature coefficient of resistance, and the resistor 60 may be made wholly or in part of copper, nickel, iron, or the like.

As is readily apparent, other means may be used for causing variations in the resistance on either the high or low voltage side of the tap 63; for example, a temperature controlled potentiometer such as is illustrated in the copending application of Herzog Ser. No. 583,315, hereinbefore referred to, may be substituted for part or all of the resistors on the high voltage side of taps 63, being operated to secure increased resistance with increase in temperature; or they may be substituted for part or all of the resistors on the low voltage side of the tap 63 if operated in reverse; that is, to secure decreased voltage output from tube 49 with increase in temperature.

In using the pentode 53 as the regulator tube, suitable means are provided to secure the proper voltage on the screen grid 66, derived either from the output voltage from tube 49, or from the input voltage impressed upon it. As illustrated, a potentiometer 67 may be connected in parallel with the resistors 60 to 62 between the resistor 59 and the ground, and the desired voltage for the screen grid taken off by a movable tap 68 and conductor 69. The suppressor grid 70 of the pentode 53 is connected with the cathode and is maintained at the cathode voltage.

In illustrating the circuits in Figs. 1 and 2, the heating circuits for the filaments and cathodes for the various tubes have not been shown in order to simplify the drawing, since such circuits are well-known in the art. In order to provide the necessary heating current for the cathodes and cathode heaters of the device described, as well as of other tubes contained within the instrument housing, current is taken off from the conductor 11 through the conductor 72 to the primary 73 of a transformer 74. This transformer is provided with secondary coil windings 75, 76 and 77 in the necessary number and suitably constructed to take off heating currents of the desired voltages.

It may be desirable to maintain a stable positive voltage above ground voltage (or that of the instrument housing) on the cathode 57 of the regulator tube 53. The cathode 57 is shown as being supplied with a stabilized positive voltage, which may suitably be done in the following manner.

In parallel with the primary coil 73 of the transformer 74, which takes alternating current from conductor 11, there is connected a rectifier diode tube 78 through a conductor 79 and choke coil 80. The rectifier tube 78 is shown as of the indirectly heated type. The rectified current is taken off the cathode of the tube 78 through the filter 82, which smooths the ripples in the rectified current. These circuits may suitably be contained in power pack 21. The rectified direct current potential taken off from the tube 78 is impressed on conductor 22. It is at a considerably lower voltage than that taken off the rectifier tube 44; for example, in connection with the use of one type of detector, the voltage of the current taken off the rectifier tube 44 is in the order of 1800 volts and that taken off the tube 78 in the order of 200 volts.

The conductor 22 is connected through the conductor 24 and resistor 84 to the cathode 57 of the regulator tube 53 and the direct current potential supplied is stabilized by means of the gas filled diode or glow tube 86, suitably a VR-105 tube, the cathode of which is grounded or connected to the instrument housing. The resistance of resistor 84 is selected to limit the current through tube 86 to a desired value where best voltage regulation from tube 86 is obtained which may be in the order of 90 to 100 volts.

The regulated current derived from the control tube 49 is supplied through the conductor 14 and resistor 15 to the anode 85 of the detector 13, which in Fig. 2 is illustrated schematically by the showing of an anode 85 and cathode 86. The cathode 86 is grounded to the instrument housing through the conductor 17. The pulses produced by the detector 13 as a result of radioactivity in the formations encountered, either natural or induced, are transmitted through conductor 18 to the quenching and amplifying circuits, indicated diagrammatically at 19 and to which reference has previously been made. The amplified pulses are transmitted to the cable, suitably through a transformer coupling, as indicated in Fig. 1.

The operation of the voltage control system for the direct current voltage supply to the detector electrodes is as follows:

Since the temperature control means of the present invention is included in the same housing with the radiation detector, it will be subjected to substantially the same temperature variations. Assuming a substantially fixed or normal temperature of the instrument, the operation of the control system is the same as in the usual control systems of this character. The bias of the grid 50 of the control tube 49 being such as to permit the desired current to pass, if a fluctuation in the current source causes a rise in voltage on the output side of the tube 49, the potential of the grid 65 rises, permitting increased current flow through the regulator tube 53 and reducing the potential at the plate 56. This correspondingly reduces the potential on the control grid 50 of the control tube 49 and decreases the flow of current through that tube, thus maintaining the output voltage constant.

If now the temperature to which the instrument is subjected is increased as the instrument passes to a different level, the potential level at which the output of the tube 49 is maintained should be raised. On increase in temperature, the resistance of the resistor 60 increases at a greater rate than do the resistances of the other resistors 59 to 62, with the result that the ratio of the resistances in the voltage divider constituted by these resistors changes and the voltage or potential of the grid 65 of the regulator tube 53 decreases. This causes the plate potential of this tube to rise and at the same time raises the grid potential of the grid 50. This causes increased flow of current through the control tube 49 and raises the potential of the output impressed through the conductor 14 upon the electrodes of the detector. As long as the temperature of the instrument remains constant at the higher temperature, the system will be controlled in the usual manner to maintain the output of the control tube 49 at this higher potential value, and the system is quickly responsive to changes in temperature as well as to variations in output of the control tube 49 from other causes. As an illustrative example, in a system in which the output voltage from the tube 49 was slightly over 1000 volts that impressed upon the anode of detector was 1000 volts at 70° F., as hereinbefore referred to, the total resistance of the resistors 59 to 62 was 1 megohm, and the resistance on the low voltage side of the tap 64 was in the range between 150,000 and 200,000 ohms. These figures are resistances at about 70° F. One resistor on the high voltage side of the divider, of 25,000 ohms resistance at about 70° F., was made of copper. The remaining resistors of the voltage divider were made of materials having substantially zero temperature coefficients of resistance, such as manganin or constantan.

It is readily apparent that the temperature control means of the present invention can be used wherever a shift in voltage with changes in temperature is desired. Furthermore, although the present invention has been described in a combination in which it is desired that the voltage vary as a direct function of the temperature, the inverse relation can be secured by inverting the positions of the resistors of low and high temperature coefficients of resistance in the voltage divider controlling the grid potential of the regulator tube 53.

Although the present invention has been described in connection with the details of a specific embodiment thereof, it is to be understood that such details are not to be regarded as limitations upon the scope of the invention, except in so far as included in the accompanying claims.

We claim:

1. In a current regulating and stabilizing device including a source of direct current voltage, an electronic control tube for reducing said voltage, said control tube having a control grid, and an electronic regulator tube having its plate connected to the control grid of said control tube to control the voltage thereupon and thereby control the output of the control tube, said regulator tube having a control grid, temperature responsive control means comprising a voltage divider connected to the output of said control tube, means for taking a voltage from a point on said voltage divider and impressing it on the control grid of said regulator tube, and said voltage divider including means for varying the ratio of its resistances with variations in temperature, and thereby vary the current flow through the regulator tube to vary the potential on the control grid of the control tube and thereby vary the output voltage therefrom.

2. In a current regulating and stabilizing device including a source of direct current voltage, an electronic control tube for reducing said voltage, said control tube having a control grid, and an electronic regulator tube having its plate connected to the control grid of said control tube to control the voltage thereupon and thereby control the output of the control tube, said regulator tube having a control grid, temperature responsive control means comprising a voltage divider connected to the output of said control tube, means for taking a voltage from a point on said voltage divider and impressing it on the control grid of said regulator tube, the resistors forming said voltage divider being made of materials having different temperature coefficients of resistance, whereby on variation in temperature, the ratio of resistances in said voltage divider is changed and thereby the potential on the control grid of the regulator tube, to vary the current flow through the regulator tube and thereby to vary the output voltage from the control tube.

3. In means for detecting radioactivity, a detector of the counter type, and means for impressing thereupon a controlled direct current voltage variable with temperature which comprises a source of direct current voltage higher than that impressed upon the detector, an electronic control tube having an anode connected to said source, and a cathode connected to impress reduced voltage from the output of said control tube upon said detector, said control tube having a control grid, and means for varying the potential on said control grid with variations in temperature and thereby varying the reduced voltage of said control tube which is impressed upon the detector with variations in temperature.

4. In means for detecting radioactivity, a detector of the counter type, and means for impressing thereupon a controlled direct current voltage variable with temperature which comprises a source of direct current voltage higher than that impressed upon the detector, an electronic control tube having an anode connected to said source, and a cathode connected to impress reduced voltage from the output of said control tube upon said detector, said control tube having a control grid, a second electronic tube having its plate connected with the control grid of said control tube to control the voltage thereupon and thereby control the flow of current through the control tube, said second tube having a control grid, a voltage divider connected to the output of the control tube, means for taking a voltage from an intermediate point on said voltage divider and impressing it upon the control grid of said second tube, and said voltage divider including means for varying the ratios of its resistances with variations in temperature, thereby varying the current flow through said second tube to vary the potential on the control grid of the control tube and thereby vary the voltage impressed by said control tube on the detector.

5. In means for detecting radioactivity, a detector of the counter type, and means for impressing thereupon a controlled direct current voltage variable with temperature which comprises a source of direct current voltage higher than that impressed upon the detector, an electronic control tube having an anode connected to said source, and a cathode connected to impress reduced voltage from the output of said control tube upon said detector, said control tube having a control grid, a second electronic tube having its plate connected with the control grid of said control tube to control the voltage thereupon and thereby control the flow of current through the control tube, said second tube having a control grid, a voltage divider connected to the output of the control tube, means for taking a voltage from an intermediate point on said voltage divider and impressing it upon the control grid of said second tube, the resistances forming said voltage divider being made of materials having different temperature coefficients of resistance, whereby on variation in temperature, the ratio of resistances in said voltage divider is changed and thereby the potential on the control grid of said second tube, to vary the current flow therethrough and thereby the potential on the control grid of the control tube, whereby the output voltage impressed by said control tube on the detector is also varied.

GERHARD HERZOG.
ARTHUR H. LORD, Jr.

REFERENCES CITED

The following references are of record in the file of this patent:

UNITED STATES PATENTS

| Number | Name | Date |
|---|---|---|
| 2,278,633 | Bagnall | Apr. 7, 1942 |
| 2,321,295 | Howell | June 8, 1943 |
| 2,337,911 | Mayer et al. | Dec. 28, 1943 |
| 2,416,922 | Irish et al. | Mar. 4, 1947 |

OTHER REFERENCES

Henney, Electron Tubes in Industry, 1934, p. 72.